3,479,342
6,6-ETHYLENE PREGNENES
Vlasios Georgian, Belmont, Mass., and James F. Kerwin, Broomall, Pa., assignors to Smith, Kline & French Laboratories, Philadelphia, Pa., a corporation of Pennsylvania
No Drawing. Continuation-in-part of application Ser. No. 442,784, Mar. 25, 1965. This application July 14, 1965, Ser. No. 472,055
Int. Cl. C07c *169/34, 173/00;* A61k *27/00*
U.S. Cl. 260—239.55                                                 5 Claims

ABSTRACT OF THE DISCLOSURE 6,6-ethylene pregnenes optionally substituted in the 11, 15, 16, 17, 20 and 21 positions as well as 1-dehydro derivatives have progestational and anabolic activity. The compounds are generally prepared from 6-methylene pregnenes by reaction with dimethylsulfoxonium methylide.

This application is a continuation-in-part of application Ser. No. 442,784, filed Mar. 25, 1965, now abandoned.

This invention relates to novel pregnene derivatives and more specifically to 6,6-ethylene pregnenes. These compounds have progestational and anabolic activity.

The compounds of this invention may be represented by the following general structural formula:

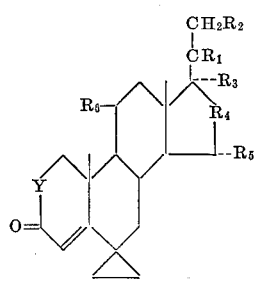

FORMULA I in which:

Y represents a single or double bond;
$R_1$ represents keto, H(OH) or H(O acyl);
$R_2$ represents hydrogen or fluorine;
$R_3$ represents hydrogen, methyl, methoxy, acetoxy or hydroxy;
$R_4$ represents $CH_2$ or $CHCH_3$;
$R_5$ represents hydrogen, hydroxy or acyloxy;
$R_6$ represents hydrogen, keto, hydroxy or acyloxy; and
$R_3$ and $R_4$ taken together form —O—C(CH$_3$)$_2$—O—CH—, —O—CH—, or

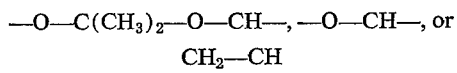

The above acyl groups contain up to 6 carbon atoms, preferably derived from a lower aliphatic carboxylic acid, such as acetyl or propionyl.

Preferred compounds are those represented by Formula I in which $R_1$ is keto.

The novel pregnene derivatives of this invention when $R_3$ above is not acetoxy are generally prepared as illustrated by the following reaction sequence:

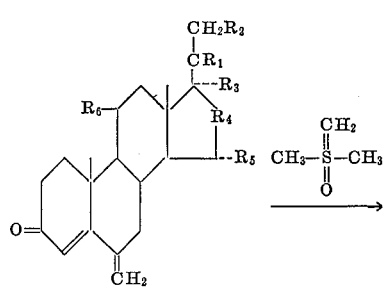

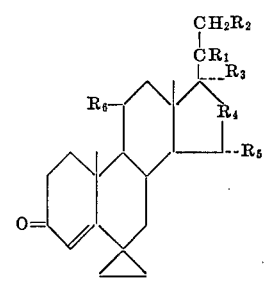

Thus a 6-methylene pregnene, as shown above, is reacted with dimethylsulfoxonium methylide (which is formed from trimethylsulfoxonium iodide in the presence of a strong base such as sodium hydride) to produce the 6,6-ethylene pregnene derivative. The 6-methylene pregnene may contain the keto hydroxy or acyloxy groups as defined for Formula I above, with subsequent optional oxidation of a hydroxy group to keto, for example, with chromic oxide and/or hydrolysis of an acyloxy group to hydroxy with, for example, an alkali metal hydroxide such as sodium or preferably potassium hydroxide.

The 6-methylene pregnenes used as starting materials herein are either known or are readily available from known compounds by methods of the steroid art. Thus, 6-methylene pregnenes are described in U.S. Patents Nos. 3,112,305 and 3,159,643; intermediate 3-enol ethers of 6-hydroxymethyl pregnenes are described in U.S. Patent No. 3,095,411; and 3-enol ethers of 6-formyl pregnenes are described in U.S. Patent No. 3,114,750. Generally, the 3-methyl enol ether of an appropriately substituted pregnene is treated with the Vilsmeir reagent (phosgene and dimethylformamide) to give the corresponding 6-formyl derivative which in turn is reduced with, for example, sodium borohydride or lithium borohydride to the 6-hydroxymethyl compound. Dehydration of this intermediate with, for example, glacial acetic acid gives the 6-methylene pregnene.

The novel pregnene derivatives of Formula I above when $R_3$ is acetoxy are prepared from 17α-acetoxy-3-methoxy-pregna-3,5-dienes, which compounds are either known to the art or are prepared by standard reactions. The pregnadiene is condensed with β-acetoxyethylmercuric acetate in a nonprotonated organic solvent, such as methylene chloride, in the presence of a Lewis acid, preferably boron trifluoride most conveniently as its etherate. Advantageously the reaction is carried out at 0–5° C. for up to about 5–7 days to give the 17α-acetoxy-6-(β-acetoxy)-ethyl-3-methoxypregna-3,5-diene. This compound is treated with dilute hydrochloric acid to give the 17α-acetoxy-6-(β-hydroxy)ethylpregn-4-en-3-one which is converted to, preferably, the 6-(p-toluene-sulfonate) ester.

The tosylate ester cyclizes in the presence of an alkali metal lower alkoxide, such as sodium methoxide, to the 17α-acetoxy-6,6-ethylene-pregn-4-en-3-one.

Obviously transformations which may occur during any of these procedures, such as hydrolysis of acyl groups or reduction to keto groups, can be rectified, optionally, by subsequent acylation or oxidation by standard methods.

The compounds of Formula I wherein Y is a double bond are advantageously prepared by oxidation by a 6,6-ethylene pregnene product or a suitable intermediate therefor with preferably dichloro-dicyanoquinone.

The compounds of this invention may be administered orally or parenterally in conventional dosage forms such as tablets, capsules, injectables or the like, by incorporating the appropriate dose of a compound of Formula I with carriers according to accepted pharmaceutical practices.

The following examples illustrate the preparative procedures described hereinabove.

EXAMPLE 1

A cold solution of 13.8 g. of phosgene in 120 ml. of methylene chloride is added dropwise with stirring over a 20 minute period to a solution of 17.1 ml. of dimethylformamide in 80 ml. of methylene chloride maintained between −5 and 0° C. The mixture is stirred for 10 minutes, and then a solution of 34.2 g. of 3-methoxy-17α-methylpregna - 3,5 - dien - 20 - one [Tetrahedron, 20 (2), 357–372 (1964)] in 250 ml. of methylene chloride containing 2.85 ml. of pyridine is added in one portion. The ice-salt bath is removed and the red mixture is stirred at ambient temperature (0 to 25° C.) for 2¼ hours. The solution is chilled and a solution of 28.0 g. of sodium acetate in 530 ml. of water is added slowly with stirring while maintaining the temperature between 10 and 15° C. After completing the addition, the reaction mixture is stirred for 5 minutes; then the ice bath is removed and the reaction mixture is stirred for 15 minutes. The reaction mixture is diluted with sufficient ether to form an upper organic phase which is separated, washed repeatedly with water, dried over anhydrous sodium sulfate, filtered, and concentrated in vacuo at 35 to 40° C. to a yellow gum. Crystallization is effected by dissolving the residue in boiling methanol containing a trace of triethylamine to give the product, 3-methoxy-6-formyl-17α-methylpregna-3,5-dien-20-one, M.P. 160.5–171.5° C.

A solution of 25.0 g. of 3-methoxy-6-formyl-17α-methylpregna-3,5-dien-20-one in 250 ml. of dried tetrahydrofuran is added dropwise over a 25 minute period to a stirred, refluxing suspension of 4.75 g. of lithium aluminum hydride in 500 ml. of dry tetrahydrofuran under a nitrogen atmosphere. After completing the addition, the refluxing is continued for 1½ hours. Then the mixture is chilled and the excess hydride is decomposed by the cautious addition of a cold solution of 20 ml. of water in 40 ml. of tetrahydrofuran. After remaining at room temperature for 18 hours, the reaction mixture is filtered and the filter cake is washed with tetrahydrofuran. The combined washing and filtrate are concentrated in vacuo at 40–45° C. to a colorless glass which is crystallized from diethyl ether or diethyl ether-petroleum ether to give the purified product, 3 - methoxy - 6 - hydroxymethyl - 20-hydroxy - 17α - methylpregna - 3,5 - diene, M.P. 136.5–148° C.

A solution of 18.4 g. of 3-methoxy-6-hydroxymethyl-20 - hydroxy - 17α - methylpregna - 3,5 - diene in 350 ml. of 3:1—glacial acetic acid:distilled water under a nitrogen atmosphere is heated on a steam bath for one hour and ten minutes. The cooled solution is poured into three liters of ice water. The solid is filtered off, washed with water, and dissolved in methylene chloride. The methylene chloride solution is washed with 5% aqueous sodium carbonate solution, water, dried over anhydrous sodium sulfate, filtered, and concentrated in vacuo to a glassy residue. This is crystallized from ethyl acetate and purified further by recrystallization from methanol to give 6-methylene - 17α - methyl - 20 - hydroxypregn - 4 - en - 3-one, M.P. 183–185° C.

To a stirred solution of 10.50 g. of trimethylsulfoxonium iodide in 130 ml. of dry dimethylsulfoxide, under a nitrogen atmosphere, 1.87 g. of a dispersion of 55.6% of sodium hydride in mineral oil is added in small portions. The mixture is stirred until all of the sodium hydride has reacted. A suspension of 13.01 g. of 6-methylene-17α-methyl - 20 - hydroxypregn - 4 - en - 3 - one in 200 ml. of dry dimethylsulfoxide is added over a six to ten minute period. After stirring for one hour at 25° C. and then for 2¼ hours in a 53 to 59° C. water bath, the reaction mixture is poured into 3 liters of cold water. The mixture is extracted with benzene. The benzene extract is washed with water, dried over anhydrous sodium sulfate, filtered, and concentrated in vacuo to a glassy residue. The residue is boiled with diethyl ether and a first crop of crystals is obtained on cooling and filtering. The concentrated filtrate is triturated with hexane and the supernatant is decanted in order to remove mineral oil. The residue gives a subsequent crop of crystals from acetone. Recrystallization from acetone gives the purified product, 6,6-ethylene-17α-methyl - 20 - hydroxypregn - 4 - en - 3 - one, M.P. 198.5–206° C.

EXAMPLE 2

A solution of 1.0 g. of 6,6-ethylene-17α-methyl-20-hydroxypregn-4-en-3-one (prepared as in Example 1) in 20 ml. of dry pyridine and 15.0 ml. of acetic anhydride is heated on a steam bath for one hour, cooled, and poured into 400 ml. of ice water. After chilling the mixture for one hour, the white precipitate is filtered off, washed with water, and dissolved in benzene. The benzene solution is washed with 8.5% aqueous phosphoric acid solution, water, 5% aqueous sodium bicarbonate solution, and water, and then dried over anhydrous sodium sulfate, filtered, and concentrated in vacuo at 45° C. to a yellow solid. Several recrystallization from methanol give the purified product, 6,6 - ethylene - 17α - methyl - 20 - acetoxypregn-4-en-3-one, M.P. 204.5–210° C.

EXAMPLE 3

A stirred solution of 5.55 g. of 6,6-ethylene-17α-methyl - 20 - hydroxypregn - 4 - en - 3 - one (prepared as in Example 1) in 700 ml. of acetone is chilled in an ice bath and a sufficient amount of Jones Reagent, a solution of 26.72 g. of chromium trioxide in 23 ml. of concentrated sulfuric acid diluted to 100 ml. with water [J. Chem. Soc. 39 (1946)], is added slowly at 5° C. The ice bath is removed and the mixture is stirred for 5 minutes and then poured into two liters of ice water. The mixture is extracted with methylene chloride. The methylene chloride extract is washed with water, 5% aqueous sodium carbonate solution, and again with water. The extract is dried over anhydrous sodium sulfate, filtered, and concentrated in vacuo to a yellow solid. This residue is dissolved in 35 ml. of benzene and 5 ml. of petroleum ether is added. The solution is chromatographed on an alumina column, eluted with 160 ml. of benzene. The concentrated eluates are combined and recrystallized from acetone-petroleum ether and then from acetone to give the purified product, 6,6-ethylene-17α-methylprogesterone, M.P. 172–174.5° C.

EXAMPLE 4

To a stirred solution of 13.2 g. of trimethylsulfoxonium iodide in 150 ml. of dimethylsulfoxide under a nitrogen atmosphere is added 2.7 g. of 55% sodium hydride portionwise. After stirring for 20 minutes, 7.5 g. of 6-methylenepregn - 4 - en - 20β - ol - 3 - one, 20 - acetate (U.S. Patent No. 3,112,305) is added and the mixture is stirred for one hour at room temperature followed by an additional hour at 50–55° C. The reaction mixture is poured into ice and water and the precipitated product is collected by filtration, washed with water, and dissolved in ether. The ethereal solution is washed with dilute sodium hydroxide and water and dried over sodium sulfate. After removal of the solvent, the residue is recrystallized to obtain the pure 6,6-ethylenepregn-4-en-20β-ol-3-one, 20-acetate melting at 210–211° C.

EXAMPLE 5

Ten grams of the 20-acetate prepared in Example 4 is refluxed for two hours in a mixture of 60 ml. methanol, 6 ml. water, and 2.5 g. of potassium hydroxide. The hydrolysis solution is cooled and diluted with water and ether. The ethereal solution is washed alkali free, dried over sodium sulfate and concentrated to crystallize the 6,6-ethylene-pregn-4-en-20β-ol-3-one, M.P. 170–175° C. Recrystallization from ether or from ethyl acetate raises the melting point to 181–182° C.

EXAMPLE 6

Eleven grams of 6,6-ethylene-pregn-4-en-20β-ol-3-one (prepared as in Example 5) is dissolved in 550 ml. acetone and the solution is stirred and cooled in an ice bath to 0–5° C. Over a half minute period 11 ml. of Jones Reagent is added whereby the temperature rises to 10–15° C. After stirring for three minutes more, 11 ml. of a saturated solution of sodium bisulfite is added, followed by 11 g. of solid sodium bicarbonate and 22 g. of sodium sulfate. The mixture is stirred for several minutes, then filtered to remove the solids which are washed well with acetone. The acetone is removed in vacuo to yield a crystalline residue which is dissolved in ether and washed with water, dilute sodium hydroxide water. After drying and removal of the solvent, the residue is purified by recrystallization to give 6,6-ethyleneprogesterone, M.P. 121–123° C.

EXAMPLE 7

To a stirred solution of 25 g. of 3-methoxy-6-formyl-pregna-3,5-dien-17α-ol-20-one, 17-acetate (U.S. Patent No. 3,114,750) in 50 ml. of methylene chloride and 100 ml. of methanol is added 2.0 g. of sodium borohydride in portions. After the addition, the solution is refluxed for 15 minutes then diluted with water and extracted with methylene chloride. The extract is washed with water and the solvent is removed to obtain a residue which is dissolved in 300 ml. of methanol and heated to reflux. Over a period of a half hour there is added dropwise a solution of 4.4 g. of potassium hydroxide in 4.4 ml. of water and 30 ml. of methanol. The solution is refluxed for an additional two hours when 80 ml. of 80% aqueous acetic acid is slowly added. The mixture is concentrated over a period of one hour and then allowed to stand to crystallize. The 6-methylene-pregn-4-en-17α-ol-3,20-dione is filtered and washed with acetone, M.P. 205–208° C.

To a stirred solution of 6.6 g. of trimethylsulfoxonium iodide in 150 ml. of dimethylsulfoxide under nitrogen is added 1.35 g. of 55% sodium hydride in portions. After adding 9.0 g. of 6-methylene-pregn-4-en-17α-ol-3,20-dione, stirring is continued for four hours at room temperature. The solution is drowned into ice and water and the precipitated product is collected by filtration and washed with water. The wet cake is dissolved in warm benzene then washed with water, dilute sodium hydroxide and water. After drying, the solvent is removed to yield a yellow crystalline residue which is recrystallized from acetone to give the 6,6-ethylene-pregn-4-en-17α-ol-3,20-dione, M.P. 224–226° C.

EXAMPLE 8

A mixture of 1.0 g. of 6,6-ethyleneprogesterone (prepared as in Example 6), 0.7 g. of dichlorodicyanoquinone and 10 ml. of dioxane is refluxed with stirring for two hours. The reaction mixture is cooled, diluted with ether and the hydroquinone filtered and washed with ether. The filtrate is concentrated in vacuo, the residue dissolved in benzene and the solution is chromatographed to give 6,6-ethylene-pregn-1,4-dien-3,20-dione.

EXAMPLE 9

Employing the general procedures outlined in the above examples, similar transformations give the following results:

(A)

*Starting material.*—6 - methylene - 16α,17α - isopropylidenedioxy-pregn-4-en - 3,20 - dione (U.S. Patent No. 3,-112,305).

*Product.*—6,6 - ethylene - 16α,17α - isopropylidenedioxy-pregn-4-en-3,20-dione.

(B)

*Starting material.*—3-methoxy-6-formyl - 16α - methyl-pregn-3,5-dien-20-one (U.S. Patent No. 3,114,750).

*Product.*—6,6 - ethylene - 16α - methyl - pregn - 4 - en-3,20-dione.

(C)

*Starting material.*—6 - methylene-15α-ocetoxy-pregn-4-en-3,20-dione (U.S. Patent No. 3,112,305).

*Product(s).*—6,6 - ethylene - 15α - acetoxy(hydroxy)-pregn-4-en-3,20-dione.

(D)

*Starting material.*—6 - methylene-16α,17α-epoxy-pregn-4-en-3,20-dione (U.S. Patent No. 3,112,305).

*Product.*—6,6 - ethylene - 16α,17α - epoxy-pregn-4-en-3,20-dione.

(E)

*Starting material.*—3-methoxy-6-formyl-16α,17α-methano-pregn-3,5-dien-20-one (U.S. Patent No. 3,114,750).

*Product.*—6,6-ethylene - 16α,17α - methano - pregn - 4-en-3,20-dione.

(F)

*Starting material.*—6-methylene-pregn - 4 - en - 3,11,20-trione (U.S. Patent No. 3,112,305).

*Product(s).*—6,6 - ethylene - pregn - 4 - en - 3,11,20-trione; 6,6-ethylene - 11β - hydroxy-pregn-4-en-3,20-dione; 6,6-ethylene-11β-acetoxy-pregn-4-en-3,20-dione.

(G)

*Starting material.*—3,17α - dimethoxy - pregn - 3,5-dien-20-one (3-methyl enol ether prepared from 17α-methoxy-pregn-4-en-3,20-dione, U.S. Patent No. 3,098,860, with methylorthoformate).

*Product.*—6,6 - ethylene - 17α - methoxy - pregn - 4-en-3,20-dione.

(H)

*Starting material.*—3 - methoxy - 6 - formyl - 21 - fluoro-pregn-3,5-diene-20-one (U.S. Patent No. 3,114,750).

*Product.*—6-6 - ethylene - 21 - fluoro - pregn - 4 - en-3,20-dione.

EXAMPLE 10

To a stirred solution of 19.5 g. of 17α-acetoxy-3-methoxypregna-3,5-dien-20-one [V. Petrow et al., Tetrahedron, 20, 597 (1964)] and 26.6 g. of β-acetoxyethylmercuric acetate in 100 ml. of methylene chloride at 0° C. is added 1.6 ml. of boron trifluoride etherate. After standing for three days at 0° C. the reaction mixture is quenched with 10 ml. of pyridine, decanted from precipitated metallic mercury, washed with aqueous sodium carbonate, dried over anhydrous magnesium sulfate, filtered, and evaporated to a residue. The residue is dissolved in 50 ml. of benzene, diluted with 100 ml. of petroleum ether and decanted from insoluble material into a column of 250 g. of activity III alumina. Elution with benzene-petroleum ether (1:2), followed by benzene gives 6 - (β-acetoxy)ethyl-17α-acetoxy-3-methoxypregna-3,5-dien-20-one which is crystallized from methanol-water to give purified material, M.P. 145–149° C. $[\alpha]_{25}^{D}$– 152°.

A solution of 12.5 g. of 6-(β-acetoxy)ethyl-17α-acetoxy-3-methoxypregna-3,5-dien-20-one in 150 ml. of methanol containing 15 ml. of 10% aqueous hydrochloric acid is heated at reflux for one hour. Most of the solvent is removed at reduced pressure. The concentrate is poured into water and extracted with methylene chloride. Evaporation of the dried methylene chloride extract gives a residue which is crystallized from acetone-ether to yield 6α-(β-hydroxy)ethyl-17α-acetoxyprogesterone, M.P. 214–216° C., $[\alpha]_{25}^{D}+43°$.

A solution of 2.0 g. of 6α-(β-hydroxy)ethyl-17α-acetoxyprogesterone and 1.4 g. of p-toluenesulfonyl chloride in 15 ml. pyridine is maintained at room temperature for three hours. The reaction mixture is poured into water and extracted with methylene chloride. The methylene chloride extract is washed with dilute phosphoric acid, dried and evaporated to a residue of 6α-(β-tosyloxy)ethyl-17α-acetoxyprogesterone.

The crude tosylate is dissolved in 10 ml. of benzene and 20 ml. of methanol, treated with 0.5 g. of sodium methoxide and stirring under nitrogen for five hours. The reaction mixture is poured into cold, dilute phosphoric acid and extracted with methylene chloride. The methylene chloride extracts are washed with dilute sodium carbonate solution, combined, dried and evaporated to a residue.

The residue is dissolved in 75 ml. of benzene-petroleum ether (1:1) and applied to a column of 60 g. of activity III alumina. The product, 6,6-ethylene-17α-acetoxyprogesterone, is eluted with benzene-petroleum ether (1:1) and benzene and is then crystallized from acetone-hexane, M.P. 213–215° C., $[\alpha]_{25}^{D}+172°$.

EXAMPLE 11

Following the procedures outlined in Example 10, 17α-acetoxy-3-methoxy-16α-methylpregn-3,5-dien-20-one (U.S. Patent No. 3,144,750) and 17α-acetoxy-21-fluoro-3-methoxypregn-3,5-dien-20-one (U.S. Patent No. 3,159,643) are similarly converted to 17α-acetoxy-6,6-ethylene-16α-methylpregn-4-en-3,20-dione and 17α-acetoxy-6,6-ethylene-21-fluoropregn-4-en-3,20-dione, respectively.

What is claimed is:

1. The method of preparing a 6,6-ethylene pregnene of the formula:

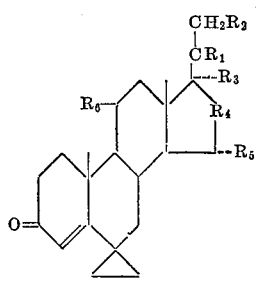

wherein:
R₁ is a member selected from the group consisting of keto, H(OH) and H(O acyl);
R₂ is a member selected from the group consisting of hydrogen and fluorine;
R₃ is a member selected from the group consisting of hydrogen, methyl, methoxy and hydroxy;
R₄ is a member selected from the group consisting of CH₂ and CHCH₃;
R₅ is a member selected from the group consisting of hydrogen, hydroxy and acyloxy;
R₆ is a member selected from the group consisting of hydrogen, keto, hydroxy and acyloxy;
R₃ and R₄ taken together represent a member selected from the group consisting of
—O—C(CH₃)₂—O—CH—
—O—CH— and —CH₂—CH—;
and each of said acyl and acyloxy groups contain up to 6 carbon atoms,
which comprises reacting a compound of the formula:

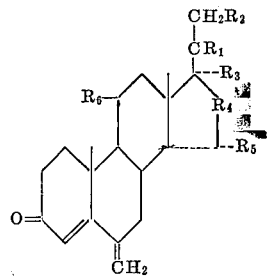

with trimethylsulfoxonium iodide in the presence of sodium hydride.

2. 6,6-ethylene-16α,17α-isopropylidenedioxy-pregn-4-en-3,20-dione.

3. 6,6-ethylene-16α,17α-epoxy-pregn-4-en-3,20-dione.

4. 6,6-ethylene-16α,17α-methano-pregn-4-en-3,20-dione.

5. A process for the preparation of steroidal 6-cyclopropyl pregn-4-en-3-ones of partial formula

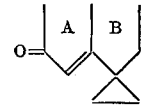

which process comprises reacting a corresponding steroidal 6-methylene-pregn-4-en-3-one of the partial formula

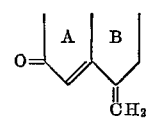

with trimethylsulfoxonium iodide in the presence of sodium hydride.

No references cited.

HENRY A. FRENCH, Primary Examiner

U.S. Cl. X.R.
260—397.3, 397.4, 397.45, 397.47, 397.5, 999